United States Patent
Kohler et al.

(10) Patent No.: US 10,967,580 B2
(45) Date of Patent: Apr. 6, 2021

(54) SUPPORT STRUCTURES FOR ADDITIVELY-MANUFACTURED COMPONENTS AND METHODS OF SECURING A COMPONENT TO A BUILD PLATFORM DURING ADDITIVE MANUFACTURING

(71) Applicant: General Electric Company, Schenectady, NY (US)

(72) Inventors: Jeffrey Alan Kohler, Cincinnati, OH (US); Valeria Proano Cadena, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 16/133,963

(22) Filed: Sep. 18, 2018

(65) Prior Publication Data
US 2020/0086580 A1 Mar. 19, 2020

(51) Int. Cl.
*B29C 64/40* (2017.01)
*B22F 3/105* (2006.01)
*B33Y 10/00* (2015.01)
*B33Y 30/00* (2015.01)
(Continued)

(52) U.S. Cl.
CPC ............ *B29C 64/40* (2017.08); *B22F 3/1055* (2013.01); *B22F 2003/1058* (2013.01); *B33Y 10/00* (2014.12); *B33Y 30/00* (2014.12)

(58) Field of Classification Search
CPC ....... B29C 64/40; B22F 3/1055; B33Y 10/00; B33Y 30/00
See application file for complete search history.

(56) References Cited

U.S. PATENT DOCUMENTS

| | | |
|---|---|---|
| 5,595,703 A | 1/1997 | Swaelens et al. |
| 7,381,921 B2 | 6/2008 | Hagemeister et al. |
| 9,597,730 B2 | 3/2017 | Mironets et al. |
| 9,808,865 B2 | 11/2017 | Rogers |

(Continued)

FOREIGN PATENT DOCUMENTS

| | | | |
|---|---|---|---|
| DE | 102015119746 A1 * | 5/2017 | ............. B33Y 10/00 |
| DE | 102015119746 A2 | 5/2017 | |

(Continued)

OTHER PUBLICATIONS https://www.merriam-webster.com/dictionary/asterisk (Year: 2020).*
(Continued)

*Primary Examiner* — Joseph S Del Sole
*Assistant Examiner* — Melody Tsui
(74) *Attorney, Agent, or Firm* — Dority Manning, P.A.

(57) ABSTRACT

Additively manufactured components include a support structure and a component body integrally formed with the support structure using an additive-manufacturing process. The support structure includes an array of support members and at least some of the support members have a conduction gate such that the array of support members includes conduction gates distributed at a multitude of locations along the vertical axis of the respective support members. Methods of securing a body of a component to a build platform during additive manufacturing include forming a support structure and a component body integrally with the support structure using the additive-manufacturing process, in which the support structure includes an array of support members and at least some of the support members have a conduction gate such that the array of support members includes conduction gates distributed at a multitude of locations along the vertical axis of the respective support members. The support members that include a conduction gate have a first cross-sectional width and the conduction gate has a second cross-sectional width narrower than the first cross-sectional width.

20 Claims, 15 Drawing Sheets

(56) References Cited

U.S. PATENT DOCUMENTS

| | | | |
|---|---|---|---|
| 9,918,811 | B2 | 3/2018 | Beeby et al. |
| 2015/0360421 | A1 | 12/2015 | Burhop et al. |
| 2016/0305325 | A1 | 10/2016 | Cunha et al. |
| 2016/0311024 | A1* | 10/2016 | Thiel .................... B29C 64/153 |
| 2016/0370007 | A1 | 12/2016 | Hongoh |
| 2017/0232512 | A1 | 8/2017 | Joerger |
| 2017/0232671 | A1 | 8/2017 | Fieldman |
| 2017/0232672 | A1 | 8/2017 | Fieldman et al. |
| 2017/0232683 | A1 | 8/2017 | Alcantara Marte et al. |
| 2017/0297111 | A1 | 10/2017 | Myerberg et al. |
| 2018/0029306 | A1 | 2/2018 | Gold et al. |
| 2018/0056100 | A1 | 3/2018 | Cockerham et al. |
| 2018/0111334 | A1 | 4/2018 | Gold et al. |
| 2018/0311734 | A1 | 11/2018 | Herzog et al. |

FOREIGN PATENT DOCUMENTS

| | | | |
|---|---|---|---|
| WO | WO2012/131481 A1 | 10/2012 | |
| WO | WO-2012131481 A1 * | 10/2012 | ............ B22F 3/1055 |

OTHER PUBLICATIONS https://www.lexico.com/en/definition/stepwise (Year: 2020).*

International Search Report Corresponding to Application No. PCT/US2019/051669 dated Nov. 5, 2019.

Gan MX et al., "Practical support structures for selective laser melting", Journal of Materials Processing Technology, vol. 238, Elsevier, NL, Aug. 6, 2016, pp. 474-484 (Abstract Only).

NC State University, 3D Printing an Argon Diffuser for Heat Treatment of DMLS Parts, Posted in Blog Jan. 17, 2014, 5 pages. https://www.camal.ncsu.edu/3d-printing-argon-diffuser-heat-treatment-dmls-parts/.

Poyraz et al., Investigation of Support Structures for Direct Metal Laser Sintering (DMLS) of IN625 Parts, TUSAS Engine Industries, Inc., Turkey, pp. 560-574.

Yadroitsev et al., Residual Stress in Metal Specimens Produced by Direct Metal Laser Sintering, Department of Mechanical and Mechatronic Engineering, Central University of Technology, South Africa, pp. 614-625.

Cooper, DMLM Supports: Are They the Jewelry Industry's New Sprue, Riser and Gate Feed?, Jewellery Industry Innovation Centre, School of Jewellery, Birmingham City University, U.K., May 2014, 22 Pages.

Smith, Metal Additive Manufacturing Process Series: Introduction, Qualified Rapid Products, 2014, 11 Pages.

Moylan et al., Lessons Learned in Establishing the NIST Metal Additive Manufacturing Laboratory, NIST Technical Note 1801, National Institute of Standards and Technology, Jun. 2013, 41 pages. https://nvlpubs.nist.gov/nistpubs/TechnicalNotes/NIST.TN.1801.pdf.

* cited by examiner

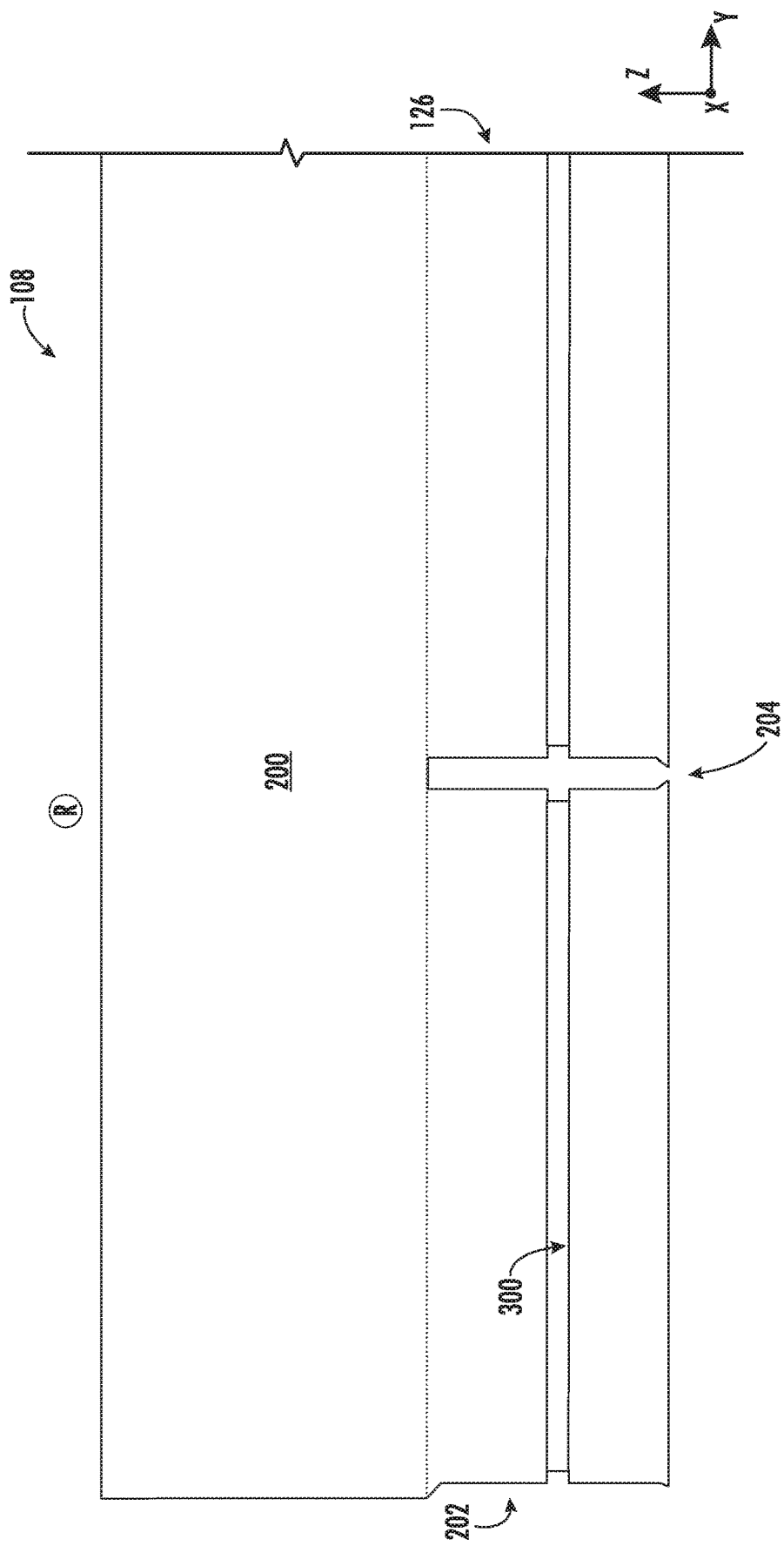

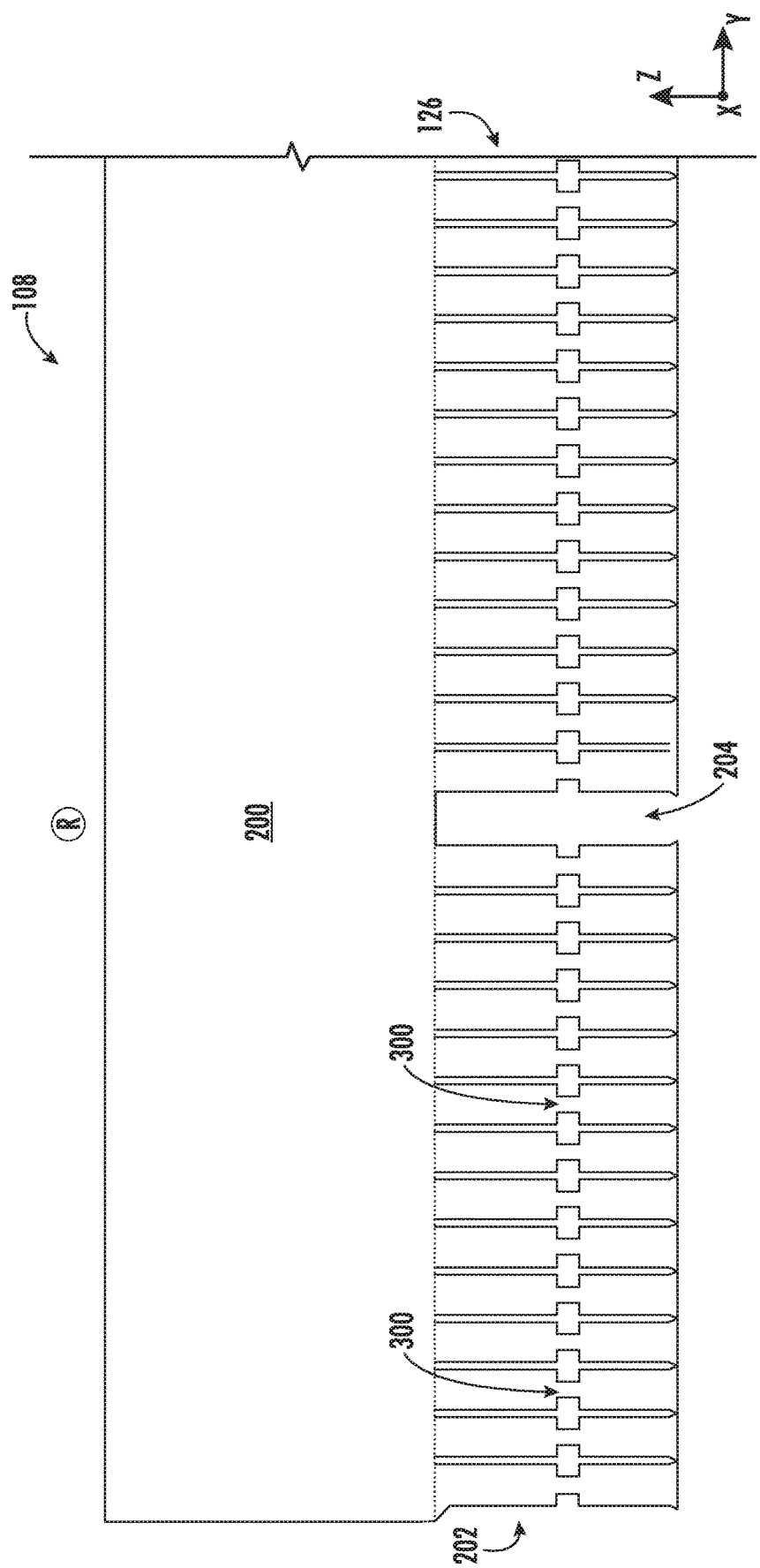

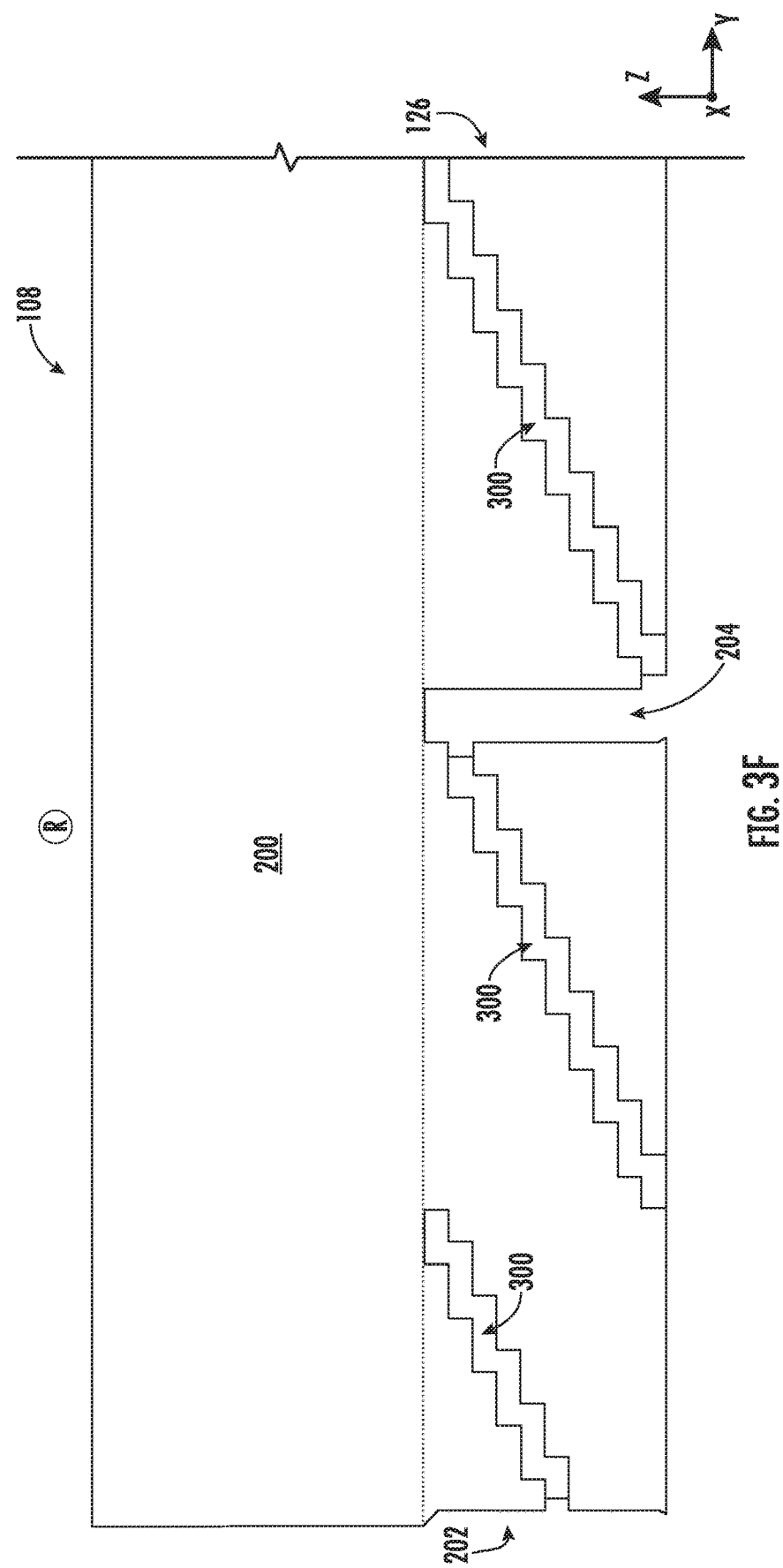

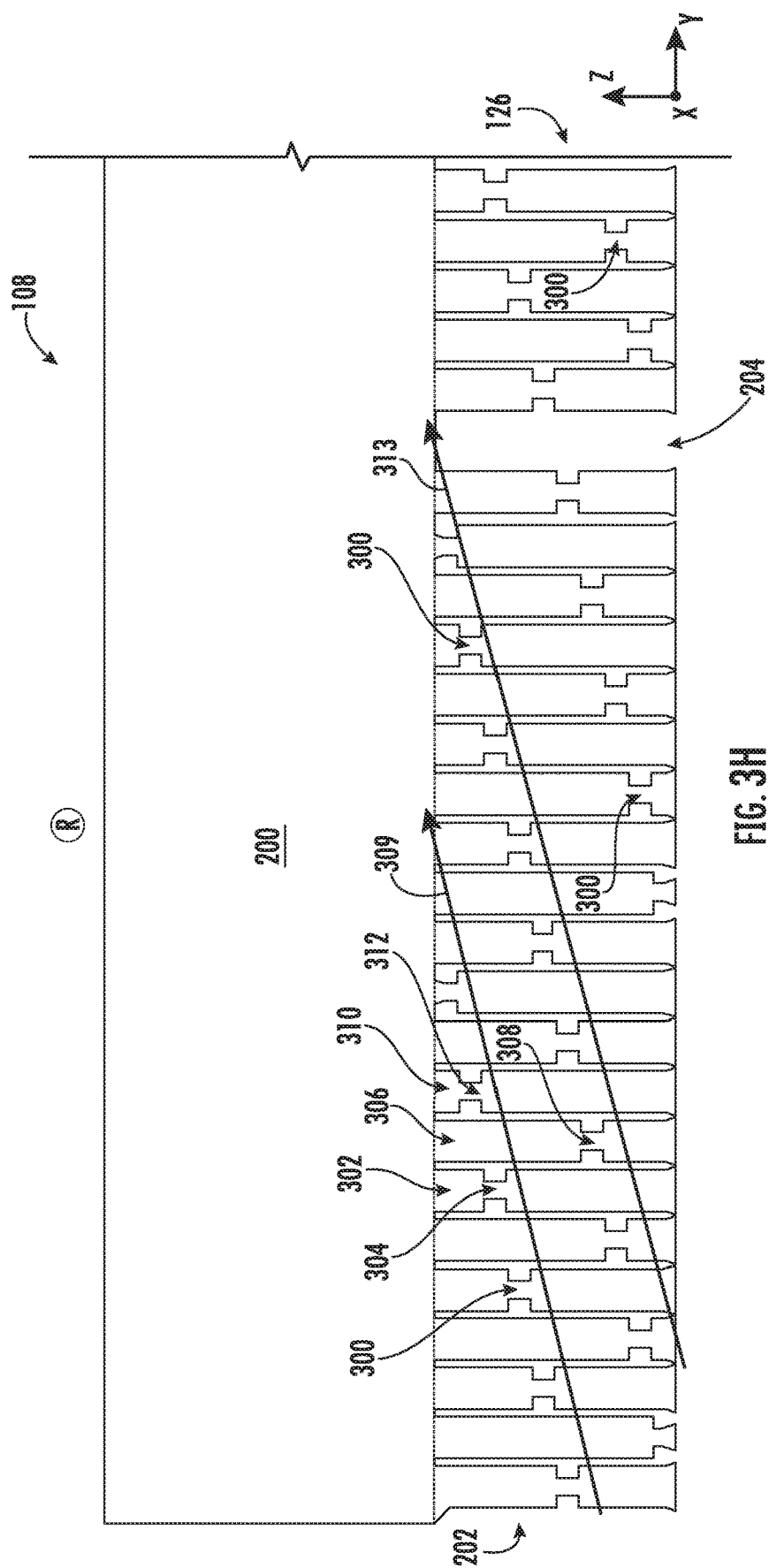

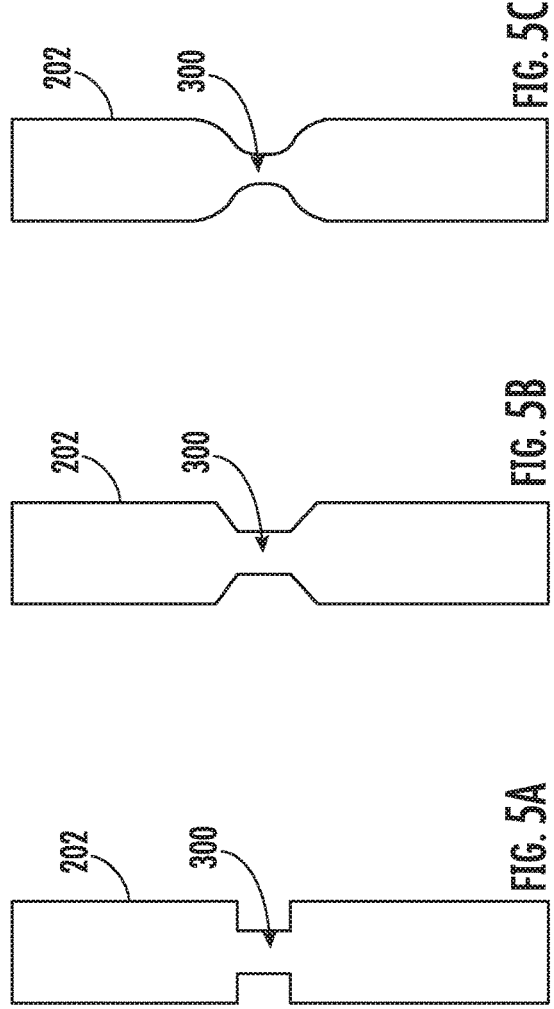
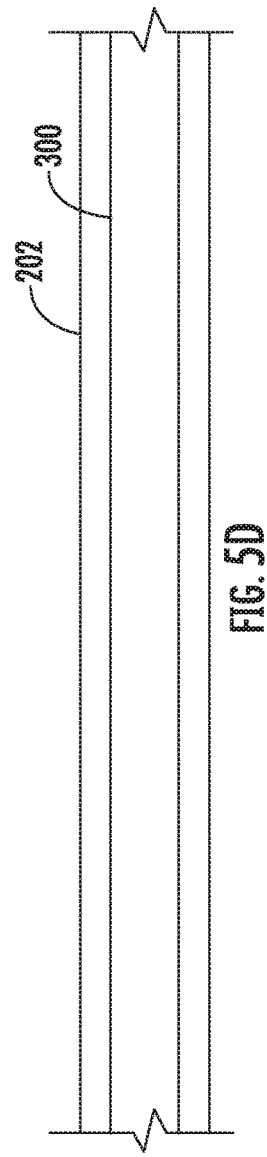
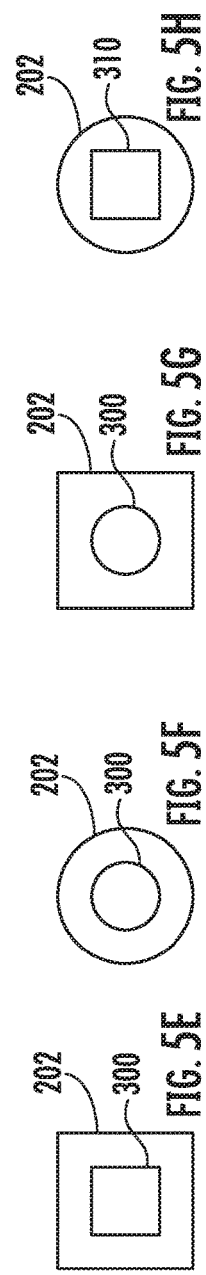

SUPPORT STRUCTURES FOR ADDITIVELY-MANUFACTURED COMPONENTS AND METHODS OF SECURING A COMPONENT TO A BUILD PLATFORM DURING ADDITIVE MANUFACTURING

FIELD

The present disclosure pertains to support structures for additively-manufactured components, and methods of securing a component to a build platform during additive manufacturing.

BACKGROUND

When fabricating a component using an additive manufacturing systems such as a powder bed fusion (PBF) system, support structures may be utilized to anchor the component to a build platform and provide a thermally conductive pathway for heat to dissipate from the component. As examples, PBF systems include direct metal laser melting (DMLM) systems, electron beam melting (EBM) systems, selective laser melting (SLM) systems, directed metal laser sintering (DMLS) systems, and selective laser sintering (SLS) systems. These PBF systems involve focusing an energy beam onto a bed of powder to melt or sinter sequential layers of powder to one another to form a component. The powder undergoes rapid changes in temperature, which can create significant residual stresses in the component, the support structure, and/or the build platform. These residual stresses can cause the component and/or the build platform to warp when cooling, or for the component to break away from the support structure, or for the support structure to break away from the build platform, particularly when large temperature gradients exist within the component or the support structure.

Larger support structures may be provided to supply increased holding strength through a larger contact surface between the component and the support structure and/or the support structure and the build platform. However, for large components, larger support structures may conduct a significant amount of heat to the build platform such that the build platform may warp when cooling. In addition, larger support structures tend to require more time and energy to remove relative to smaller support structures during post fabrication processes. On the other hand, smaller support structures have less holding strength and may increase the likelihood of the component breaking away from the support structure and/or the support structure breaking away from the build platform. When the component and/or the build platform warps or breaks away from the support structure, the component may interfere with the recoater of a PBF system, causing a malfunction of the PBF system and/or an unsuccessful build.

Accordingly, there exists a need for improved support structures for additively manufactured components, and for improved methods of supporting a component during additive manufacturing.

BRIEF DESCRIPTION

Aspects and advantages will be set forth in part in the following description, or may be obvious from the description, or may be learned through practicing the presently disclosed subject matter.

In one aspect, the present disclosure embraces additively manufactured components that include a support structure and a component body integrally formed with the support structure using an additive-manufacturing process. The support structure includes an array of support members and at least some of the support members have a conduction gate such that the array of support members includes conduction gates distributed at a multitude of locations along the vertical axis of the respective support members. The support members that include a conduction gate have a first cross-sectional width and the conduction gate has a second cross-sectional width narrower than the first cross-sectional width.

In another aspect, the present disclosure embraces methods of securing a body of a component to a build platform during additive manufacturing. Exemplary methods include forming a support structure and a component body integrally with the support structure using the additive-manufacturing process, in which the support structure includes an array of support members and at least some of the support members have a conduction gate such that the array of support members includes conduction gates distributed at a multitude of locations along the vertical axis of the respective support members. The support members that include a conduction gate have a first cross-sectional width and the conduction gate has a second cross-sectional width narrower than the first cross-sectional width.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 3A-3H show cross-sectional views of exemplary support structures;

FIGS. 5A-5C show side-views of exemplary support members that may be included in a support structure;

FIGS. 5D-5H show cross-sectional views exemplary support members that may be included in a support structure.

Figure 1:
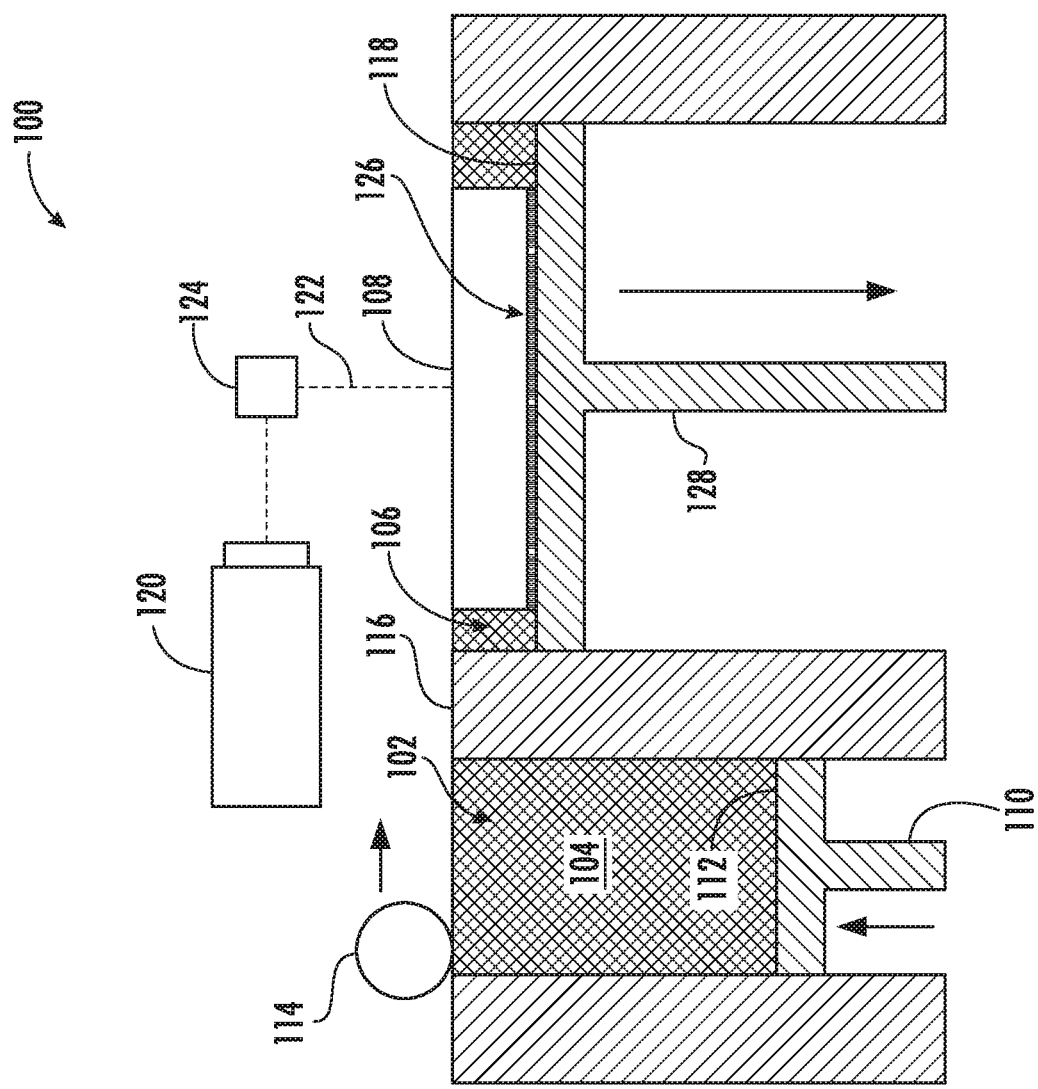
FIG. 1 schematically depicts a cross-sectional view of an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure provides support structures for additively-manufactured components, and methods of securing a component to a build platform during additive manufacturing. Exemplary additively-manufactured components include a support structure and a component body integrally formed with the support structure using an additive-manufacturing process. The support structure includes an array of support members, and at least some of the support members have a conduction gate with a narrower cross-sectional width than that of the support member. Although the narrowing of the cross-sectional width of the conduction gates may allow for a support member to more easily fracture at a conduction gate, the conduction gates may slow the rate of heat conduction through the support members to the build platform. The slower rate of heat conduction provided by the conduction gates may increase the likelihood of a successful build, for example, by reducing the accumulation of heat in the build platform and/or by reducing the tendency for a component body and/or the build platform to warp when cooling. Although some support members may break at the conduction gates, the conduction gates may reduce the tendency for large portions of the component body to break away from the support structure and/or for large portions of the support structure to break away from the build platform.

The conduction gates may also provide for a more uniform rate of heat transfer from the support structure to the build platform across various regions of the support structure, which may reduce residual stresses in the support structure and/or in the body of the component. Such reduced residual stresses may correspond to a lower tendency for the support structure to break, for example, at fracture planes where the component body attaches to the support structure and/or where the support structure attaches to the build platform. In some embodiments, the conduction gates may provide an alternate fracture plane. This alternate fracture plane may require less force to break a particular support member of a support structure relative to a support member that does not have a conduction gate. However, the conduction gates may be distributed along the vertical axis of the respective support members so as to separate these alternate fracture planes relative to adjacent support members, which may reduce the tendency for fracture planes to propagate across the support structure in the event that a particular support member fractures. In some embodiments, the conduction gates may provide an alternate fracture plane that selectively allows individual support members to fracture locally where residual stresses are greatest while the vertical separation of the conduction gates may prevent the fracture from propagating, thereby alleviating residual stresses while isolating the location of the fracture to the area where residual stresses are greatest.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

FIG. 1 shows an exemplary additive manufacturing system 100. The exemplary additive manufacturing system may include a powder bed fusion (PBF) system, such as a direct metal laser melting (DMLM) system, an electron beam melting (EBM) system, a selective laser melting (SLM) system, a directed metal laser sintering (DMLS) system, or a selective laser sintering (SLS) system. The additive manufacturing system 100 builds components in a layer-by-layer manner by melting or fusing sequential layers of a powder material to one another. An exemplary additive manufacturing system 100 includes a powder supply chamber 102 that contains a supply of powder 104, and a build chamber 106 within which a component 108 may be additively manufactured in a layer-by-layer manner. The powder supply chamber 102 includes a powder piston 110 which elevates a powder floor 112 during operation of the system 100. As the powder floor 112 elevates, a portion of the powder 104 is forced out of the powder supply chamber 102. A recoater 114 such as a roller or a blade pushes some of the powder 104 across a work surface 116 and onto a build platform 118. The recoater 114 sequentially distributes thin layers of powder 104 onto the build platform 118. An energy source 120 directs an energy beam 122 such as a laser or an electron beam onto the thin layer of powder 104 to melt or fuse the sequential layers of powder 104. Typically with a DMLM, EBM, or SLM system, the powder 104 is fully melted, with respective layers being melted or re-melted with respective passes of the energy beam 122. Conversely, with DMLS, or SLS systems, layers of powder 104 are sintered, fusing particles of powder 104 with one another generally without reaching the melting point of the powder 104.

A scanner 124 controls the path of the beam so as to melt or fuse only the portions of the layer of powder 104 that are to become part of the component 108. The first layer or series of layers of powder 104 are typically melted or fused to the build platform 118, and then sequential layers of powder 104 are melted or fused to one another to additively manufacture the component 108. The first several layers of powder 104 that become melted or fused to the build platform 118 define a support structure 126 for the component 108. As sequential layers of powder 104 are melted or fused to one another, a build piston 128 gradually lowers the build platform 118 so as to make room for the recoater 114 to distribute sequential layers of powder 104. Sequential layers of powder 104 may be melted or fused to the component 108 until a completed component 108 has been fabricated.

Generally the support structure 126 provides a surface to which sequential layers of powder 104 may be melted or fused, while holding the sequential layers of melted or fused powder in position while resisting residual stresses caused by rapid changes in temperature as the energy beam 122 melts or fuses the sequential layers of powder 104. The support structure 126 also provides a thermally conductive pathway to dissipate heat generated by the energy beam 122. Typically a support structure 126 may be fabricated in the same manner as the component 108. In some embodiments, the same powder 104 may be used to fabricate the support structure 126 and the component 108. Alternatively, in some embodiments a different powder 104 may be used for the support structure 126 and the component 108. When forming the support structure 126, typically the energy beam 122 melts or sinters the top surface of the build platform 118 together with the first few layers of powder 104 so as to securely weld (e.g., melt or fuse) the support structure 126 to the build platform 118. After the component 108 has been fabricated, the support structure 126 may be removed from the component 108 in post-fabrication processes. For example, the component 108 may be cut away from the support structure 126 using an electrical discharge machine (EDM) such as a wire-cut EDM or other suitable cutting tool.

Figure 2A:
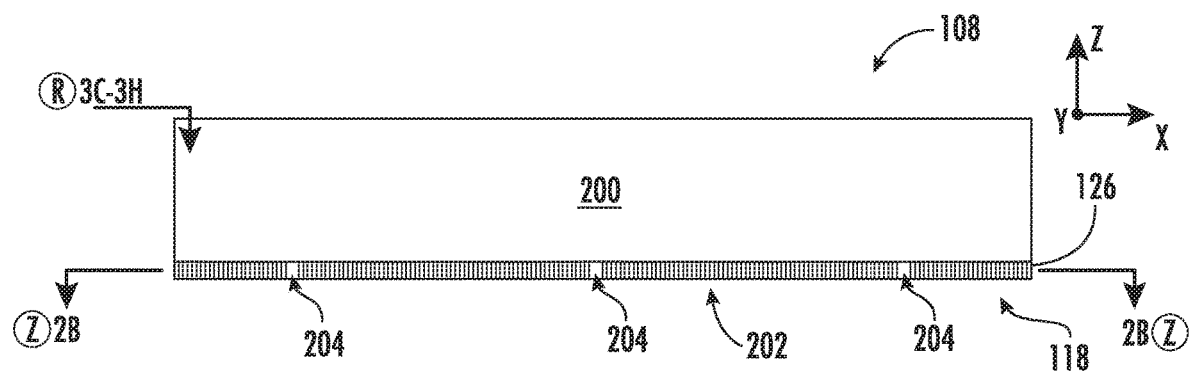
FIG. 2A shows a side perspective view of an exemplary component and support structure.
Figure 2B:
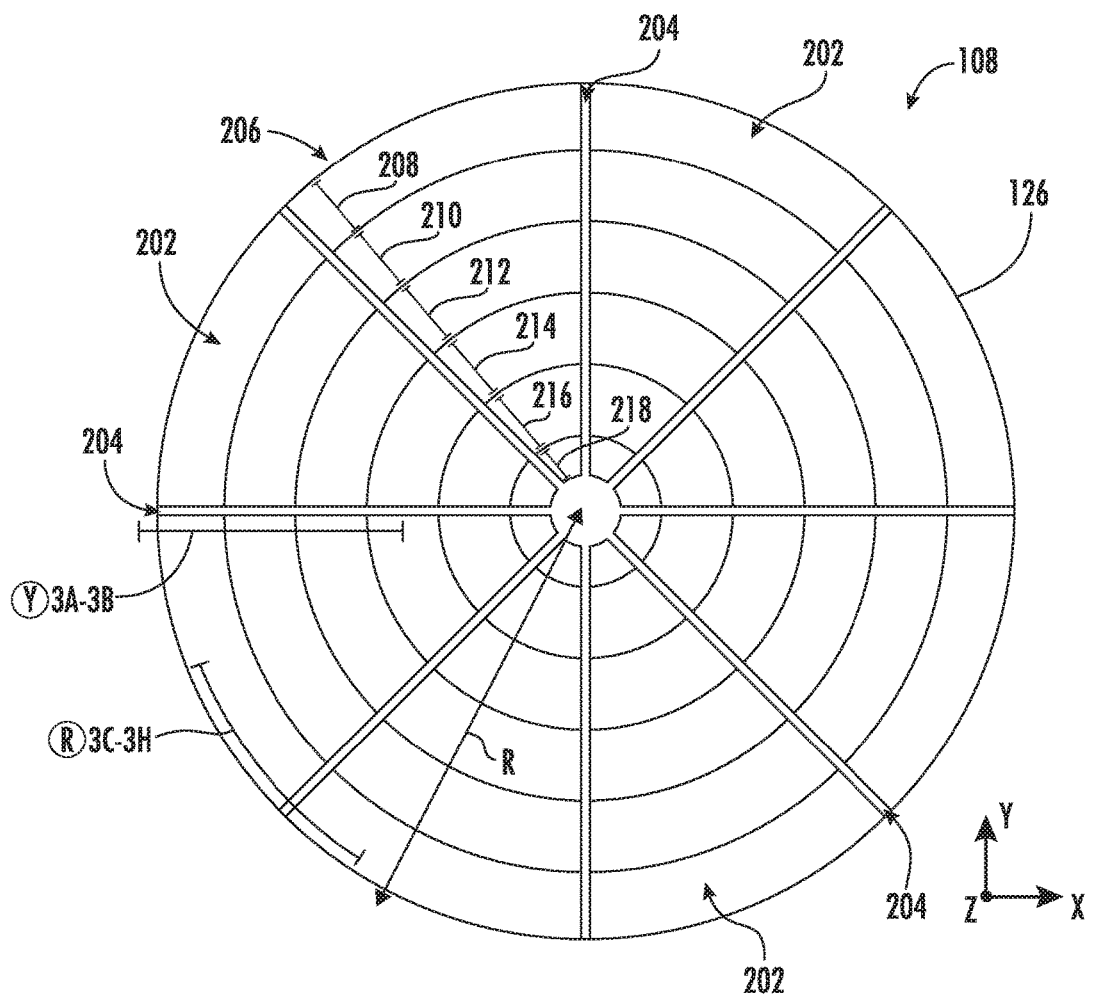
FIG. 2B shows a cross-sectional view of the support structure shown in FIG. 2A.

FIG. 2A shows an exemplary component 108 with a support structure 126 securing the component 108 to a build platform 118. FIG. 2B shows a cross-sectional view of the support structure 126 shown in FIG. 2A. The component 108 may be oriented with reference to a Cartesian coordinate system having an X-axis, a Y-axis, and a Z-axis in which the X-axis and Y-axis define a plane that is generally parallel with the build platform 118, and a Z-axis defines an elevation or height of the component 108 relative to the build platform 118. As shown, the component 108 includes a component body 200 and the support structure 126 includes an array of support members 202, with both the component body 200 and the array of support members 202 having been formed by melting or sintering powder 104 in a PBF process such as DMLM, EBM, SLM, DMLS, or SLS. The array of support members 202 may be melted or fused to the build platform 118 so as to provide a secure connection between the array of support members 202 and the build platform 118. The component body 200 may be melted or fused to the array of support members 202 so as to provide a secure connection between the component body 200 and the array of support members 202. As shown, the array of support members 202 may include a plurality of channels 204 intermittently spaced throughout the support structure 126. The channels 204 provide a pathway for cleaning out unused powder 104 during post-fabrication processes. Additionally, the channels 204 may interrupt or isolate residual stresses in the support structure 126 caused by rapid changes in temperature during the additive manufacturing process. As shown, the support members 202 may be oriented with a vertical axis of the support members 202 being generally parallel with the Z-axis; however, in some embodiments the support members 202 may be oriented such that the vertical axis has a nonparallel angle relative to the Z-axis. For example, the support members 202 may have an angle that is equal to or less than 90 degrees, with 90-degrees corresponding to the Z-axis and zero degrees corresponding to the X-axis and/or the Y-axis. The support members 202 may be oriented at an angle from 0 to 90 degrees, such as from 5 to 85 degrees, such as from 15 to 70 degrees, such as from 30 to 55 degrees, such as from 40 to 50 degrees, such as from 25 to 35 degrees, such as from 55 to 65 degrees.

Figure 3A:
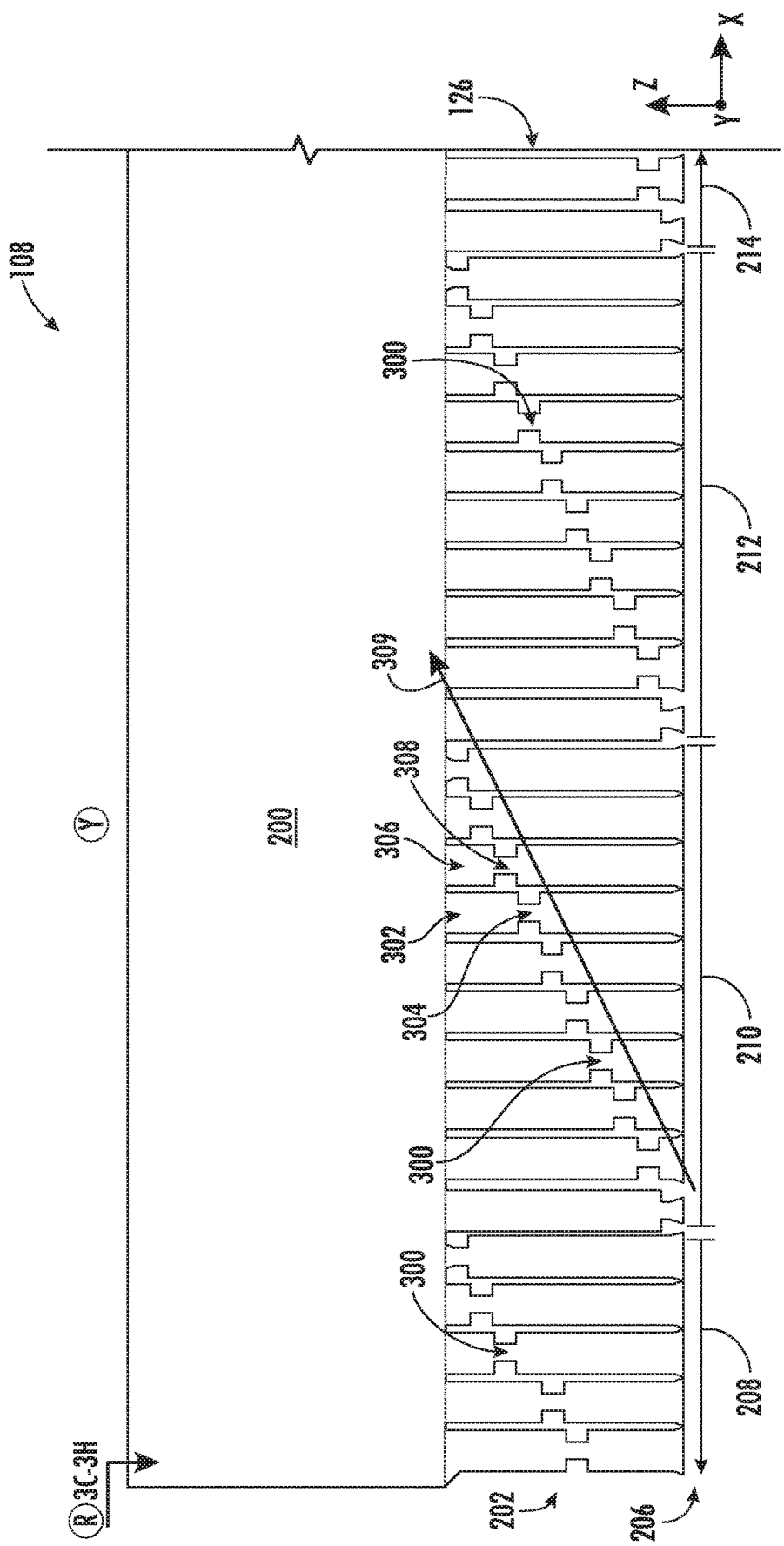
Figure 3B:
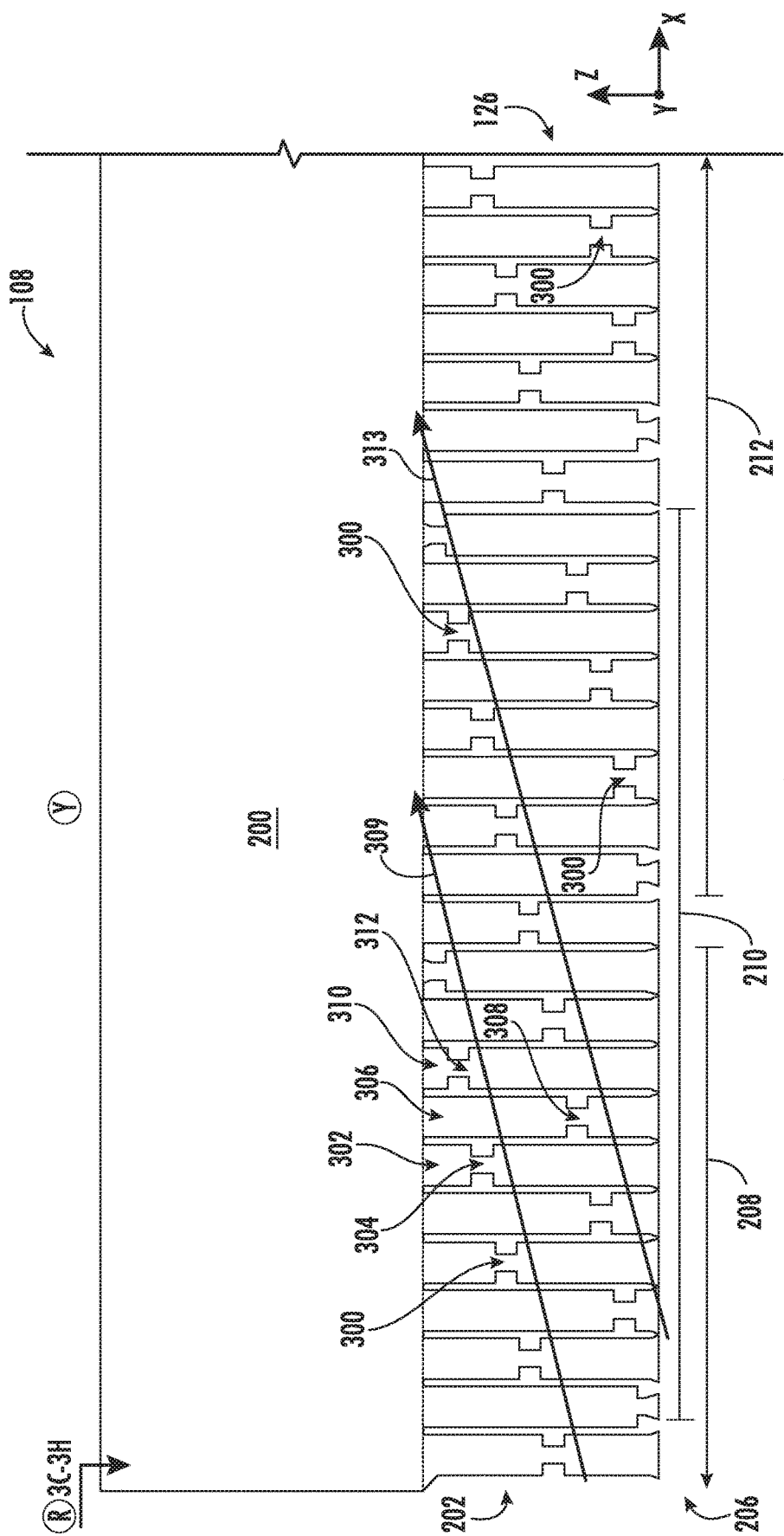

FIGS. 3A-3H show cross-sectional views of exemplary support structures 126 that include an array of support members 202. FIGS. 3A and 3B show cross-sectional views along the Y-axis. FIGS. 3C-3H show cross-sectional views along the radial-axis, or R-axis. Alternatively, FIGS. 3C-3H may be regarded as showing cross-sectional views along the X-axis. Exemplary support structures 126 may include combinations of the views shown in FIGS. 3A-3H. For example, a support structure 126 may include the Y-axis view shown in FIG. 3A combined with any one of the R-axis or X-axis views shown in FIGS. 3C-3H. As another example, a support structure 126 may include the Y-axis view shown in FIG. 3B combined with any one of the R-axis or X-axis views shown in FIGS. 3C-3H. Additionally, it will be appreciated that the respective Y-axis and R-axis or X-axis views may be interchanged with one another, and the particular axis shown in FIGS. 3A-3H are not to be limiting.

Figure 3E:
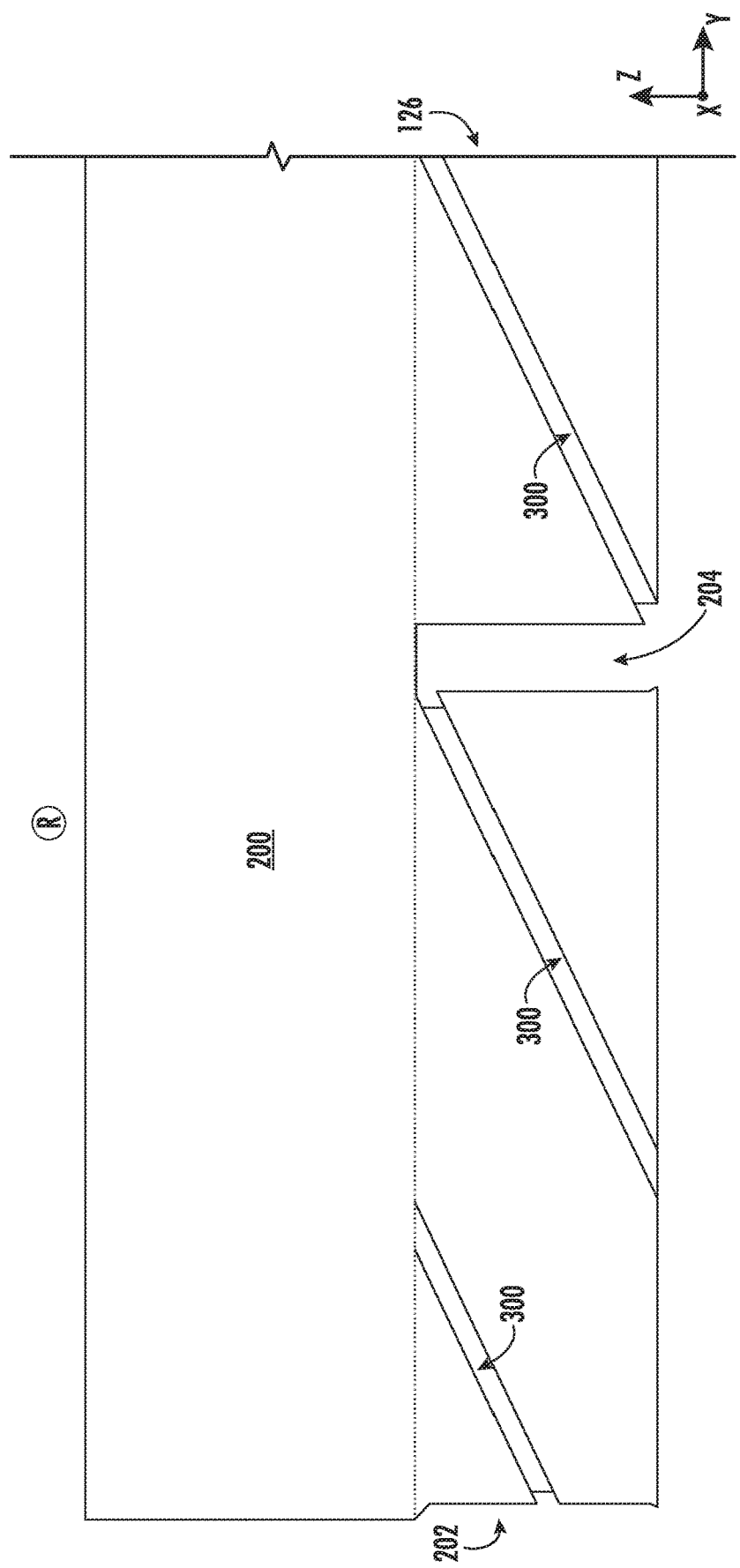

As shown in FIGS. 3A and 3B, the support members 202 may have narrow cross-sectional profile when viewed along the Y-axis. As shown in FIGS. 3C, 3E, and 3F, the support members 202 may have an elongate cross-sectional profile when viewed along the R-axis or X-axis. The narrow cross-sectional profile of FIG. 3A or 3B may combine with the elongate cross-sectional profile of FIG. 3C, 3E, or 3F to provide support members that have a rail-like configuration. In some embodiments, a support structure 126 may include an array of rail-like support members 202. By way of example, the rail-like support members may be arranged in annular rows, linear rows, and/or non-linear rows.

Figure 3G:
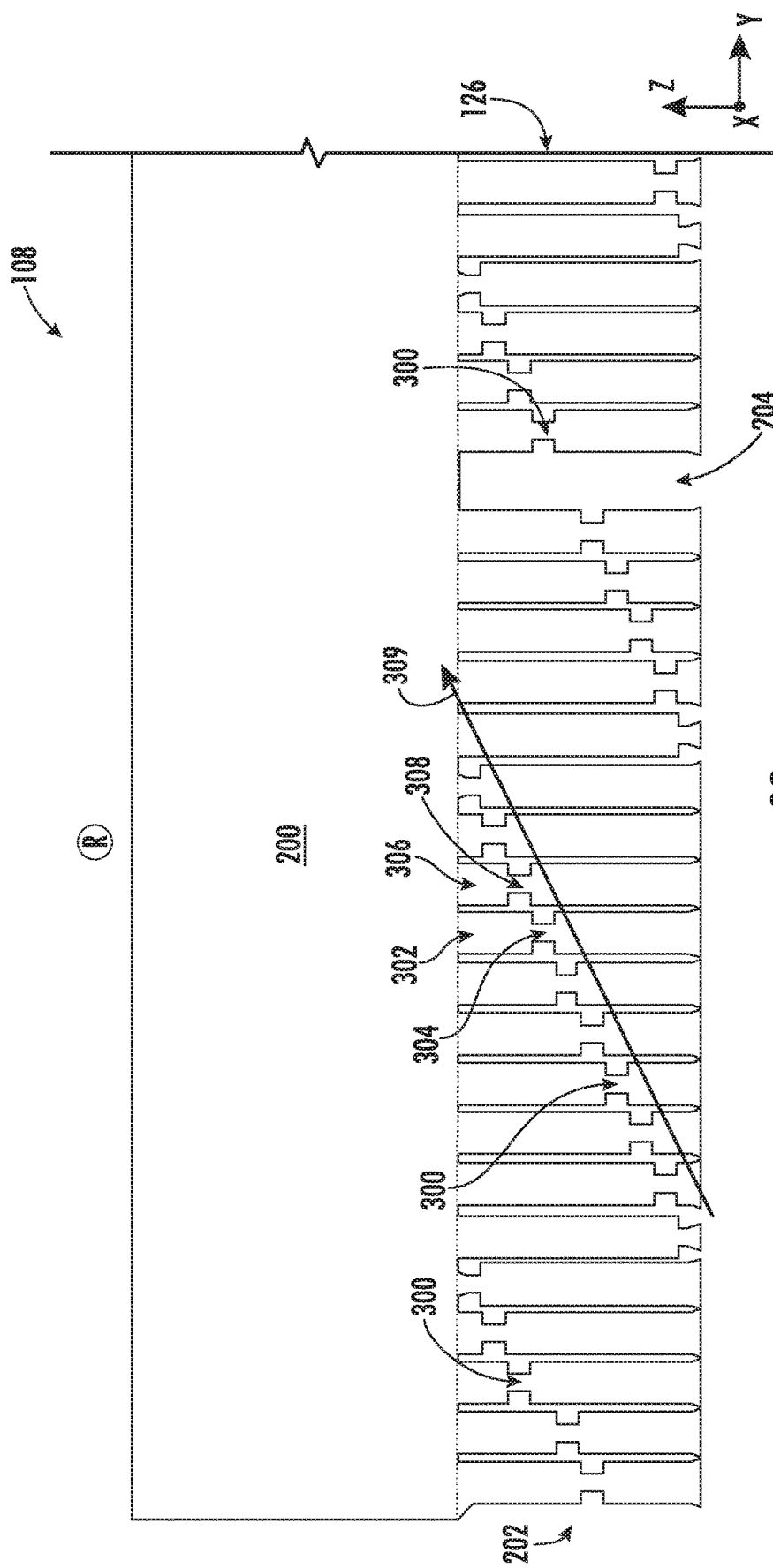

As shown in FIGS. 3D, 3G, and 3H, the support members may have a narrow cross-sectional profile when viewed along the R-axis or X-axis, and such narrow cross-sectional profile may combine with the narrow Y-axis cross-sectional profile of FIG. 3A or 3B to provide support members that have a post-like configuration. In some embodiments, a support structure 126 may include an array of post-like support members 202. By way of example, the post-like support members may be arranged in annular rows, linear rows, and/or non-linear rows. In still further embodiments, a support structure 126 may include a combination of rail-like support members and post-like support members.

Still referring to FIGS. 3A-3H, the array of support members 202 may include a plurality of conduction gates 300. At least some of the support members 202 may include a conduction gate 300. A conduction gate 300 represents a portion of a support member 202 that has a narrower cross-sectional width than surrounding areas of the support member 202. In some embodiments, a support structure 126 that includes an array of conduction gate 300—containing support members 202 may provide a more uniform rate of heat transfer across the bulk of the support structure 126 by slowing the rate of conduction through the support members 202. The rate of conduction through a support member 202 may be slowed by a conduction gate 300 because the narrower cross-sectional area of the conduction gate 300 reduces the unit area available for conduction, and the reduced area may provide resistance to thermal conduction through the support member 202. As the conduction gates 300 present a resistance to thermal conduction, the rate of conduction through the support structure 126 may be locally tempered so as to provide a more uniform rate of heat transfer across the bulk of the support structure 126.

Additionally, or in the alternative, in some embodiments the conduction gates 300 may define a fracture plane in a support member 202, whereby a support member 202 may preferentially fracture at a conduction gate 300 rather than at an interface between the support structure 126 and the build platform 118 or between the support structure 126 and the component body 200. When support members 202 of a support structure 126 fracture, there can be a tendency for the fracture to follow a fracture plane that may propagate across adjacent support members 202, allowing residual forces to warp or curl the body 200 of the component 108 and/or the build platform 118 where the support members 202 have fractured. The fracture plane may follow a crystalline lattice line, which may correspond to an interface between adjacent layers of melted or fused powder 104 located within the conduction gate 300. Common fracture planes exist at the interface between adjacent layers of melted or fused powder 104 located where the support structure 126 attaches to the build platform 118 and/or where the component body 200 attaches to the support structure 126. However, in some embodiments the conduction gates 300 may provide an alternate fracture plane, such that the support members 202 may preferentially fracture at the conduction gate 300 rather than at an interface between the support structure 126 and the build platform 118 or between the support structure 126 and the component body 200. Additionally, a conduction gate 300 may be located at intermediate position along the vertical axis of a support member 202, which location may disassociate the preferential fracture plane of the conduction gate 300 from the interface where the support structure 126 attaches to the build platform 118 and/or where the component body 200 attaches to the support structure 126.

In some embodiments, as shown for example in FIGS. 3A and 3B, a support structure 126 may include conduction gates 300 respectively located at a variety of different vertical positions of the corresponding support members 202. The vertical position of the conduction gates 300 may be ascertained, for example, with reference to a Z-axis or vertical axis of the component 108. For example, a first support member 302 may include a first conduction gate 304 located at a first vertical positon along the vertical axis of the first support member 302, and a second support member 306 may include a second conduction gate 308 located at a second vertical position along the vertical axis of the second support member 306 such that the first vertical position of the first conduction gate 304 differs from the second vertical position of the second conduction gate 308. In some embodiments, for example, as shown in FIG. 3A, the first vertical position of the first conduction gate 304 may be below the second vertical position of the second conduction gate 308. The different vertical positions of conduction gates 300 may separate respective fracture planes, which may reduce the tendency for a fracture to propagate across adjacent support members 202. The conduction gates 300 may allow individual support members to fracture locally where residual stresses are greatest while the vertical disassociation or separation of the conduction gates 300 may prevent the fracture from propagating, thereby alleviating residual stresses while isolating the location of the fracture to the area where residual stresses are greatest. It will be appreciated that while exemplary embodiments show the support members 202 having a vertical axis oriented along the Z-axis, in some embodiments the support members 202 may be angled relative with respect to the Z-axis, in which case the vertical axis may refer to the corresponding axis along the length of the support members from the build platform 118 to the component body 200.

In some embodiments, an array of support members 202 may be segmented according to a plurality of intervals 206 (FIG. 2B) distributed across the support structure 126, such as along a radial axis, the X-axis and/or the Y-axis. The intervals 206 may further interrupt or isolate residual stresses in the support structure 126 caused by rapid changes in temperature during the additive manufacturing process. As shown in FIG. 2B, an array of support members may include a first interval 208, a second interval 210, a third interval 212, a fourth interval 214, a fifth interval 216, a sixth interval 218, and so on. It will be appreciated that the six intervals shown in FIG. 2B are provided by way of example only and are not intended to be limiting. Rather, any number of intervals may be provided in accordance with the spirit and scope of the present disclosure. For example, referring again to FIG. 3A, the conduction gates 300 may be distributed at a multitude of locations along the vertical axis of the respective support members that make up an interval 206 of the support structure 126. In some embodiments, the conduction gates 300 may be distributed along the vertical axis of the respective support members 202 in a step-wise manner 309 across an interval 206 (e.g., the second interval 210), for example, as shown in FIG. 3A. Such step-wise distribution of conduction gates 300 may be linear or nonlinear. FIG. 3B shows another example of conduction gates 300 distributed along an interval 206 in a step-wise manner. With conduction gates 300 distributed along the vertical axis of respective support members 202, a series of fracture planes associated with the conduction gates may be provided which traverses multiple layers of melted or sintered powder 104. This arrangement may further reduce the tendency for a fracture to propagate across adjacent support members 202.

As shown in FIG. 3B, in some embodiments a support structure may include intervals 206 that overlap. For example, a first interval 208 may overlap a second interval 210, and a second interval 210 may overlap a third interval 212. In some embodiments, conduction gates 300 may be distributed at a multitude of locations along the vertical axis of the respective support members 202 corresponding to a respective overlapping interval 206. The overlapping intervals 206, together with the distribution of the conduction gates 300 across the vertical axis of the respective support members 202, may combine to provide a sequence of conduction gates 300, for example, that alternate between high and low positions along the vertical axis of the respective support members 202. In one embodiment, a first interval 208 and a second interval 210 may overlap one another, with each interval respectively including conduction gates 300 distributed along the respective interval 206 in a step-wise manner. The vertical position of the conduction gates 300 may alternate in sequence between the respective overlapping intervals 206. The overlapping intervals 206 (e.g., a first interval 208 and a second interval 210) are shown by way of example only and not to be limiting. It will be appreciated that any number of overlapping intervals may be provided within the spirit and scope of the present disclosure. The series of fracture planes corresponding to the overlapping alternating locations of the conduction gates may further reduce the tendency for a fracture to propagate across adjacent support members 202.

In some embodiments, as shown in FIG. 3B, an array of support members 202 within overlapping intervals 206 (e.g., a first interval 208 or a second interval 210) may include a first support member 302 associated with a first interval 208, a second support member 306 associated with a second interval 210, and a third support member 310 associated with the first interval 208. The first support member 302 may include a first conduction gate 304 located at a first position along the vertical axis of the first support member 302, the second support member 306 may include a second conduction gate 308 located at a second vertical position along the vertical axis of the second support member 306, and the third support member 310 may include a third conduction gate 312 located at a third vertical position along the vertical axis of the third support member 310. The first vertical position of the first conduction gate 204 may be above the second vertical position of the second conduction gate 308, and the third vertical position of the third conduction gate 312 may be above the second vertical position of the second conduction gate 308, for example, as ascertained with reference to the Z-axis of the component 108. In some embodiments, the third vertical position of the third conduction gate 312 may be below the first vertical position of the first conduction gate 204. The conduction gates 300 associated with the first interval 208 may be distributed along the vertical axis of the respective support members 202 in a first step-wise manner 309, and the conduction gates 300 associated with the second interval 210 may be distributed along the vertical axis of the respective support members 202 in a second step-wise manner 313.

As shown in FIG. 3C, a conduction gate 300 may extend across an elongate support member 202. As shown in FIG. 3D, an array of support members 202 may have conduction gates that align with one another at a given location along the vertical axis of the support members 202 in respect of one axis (e.g., the Y-axis). In some embodiments, such aligned conduction gates shown in FIG. 3D may vary along the vertical axis of the support member in respect of another axis (e.g., the R-axis or the X-axis), such as shown in FIGS. 3A and 3B. As shown in FIGS. 3E and 3F, a conduction gate 300 may extend across an elongate support member 202 with a slope, which slope may be linear (FIG. 3E), step-wise (FIG. 3F), or non-linear (not shown). As shown, for example, in FIG. 3G in combination with FIG. 3A and/or in FIG. 3H in combination with FIG. 3B, a support structure 126 may include an array of support members 202 with conduction gates 300 distributed along the vertical axis of the respective support members 202 in a manner that varies in respect of both the Y-axis and the R-axis or X-axis. In some embodiments, a variation in the location of the conduction gates 300 along the vertical axis of the respective support members 202 may vary in a manner that is consistent as between the Y-axis and the R-axis, or as between the Y-axis and the X-axis.

The distribution of the conduction gates 300 along the vertical axis of the respective support members 202 and/or across an interval 206 of the support structure 118 may follow any desired pattern, including an ordered pattern, a random pattern, or a semi-random pattern. As shown in FIGS. 3A and 3G, the location of the center point of the conduction gates 300 may be distributed across an interval 206 at a vertical position according to the following equation: $z(n)=(s \times n)-s/2$, where z is the vertical position of the conduction gate between 0 and L, n is the support member number in the interval 206, and s is the length of the conduction gate 300, and where the equation continues up to L and then repeats, where L is the length of the support member 202. As shown in FIGS. 3B and 3H, the conduction gates 300 are distributed across a first interval 208 and a second interval 210 at a vertical position according to the following respective equations: $z(n_1)=(s \times n_1)-s/2+0.5$ L; and $z(n_2)=(s \times n_2)-s/2$; where z is the vertical position of the conduction gate 300 between 0 and L, $n_1$ is the support member number in the first interval 208, $n_2$ is the support member number in the second interval 210, and s is the length of the conduction gate 300, and where the equations continue up to L and then repeat, where L is the length of the support member 202.

Figure 4A:
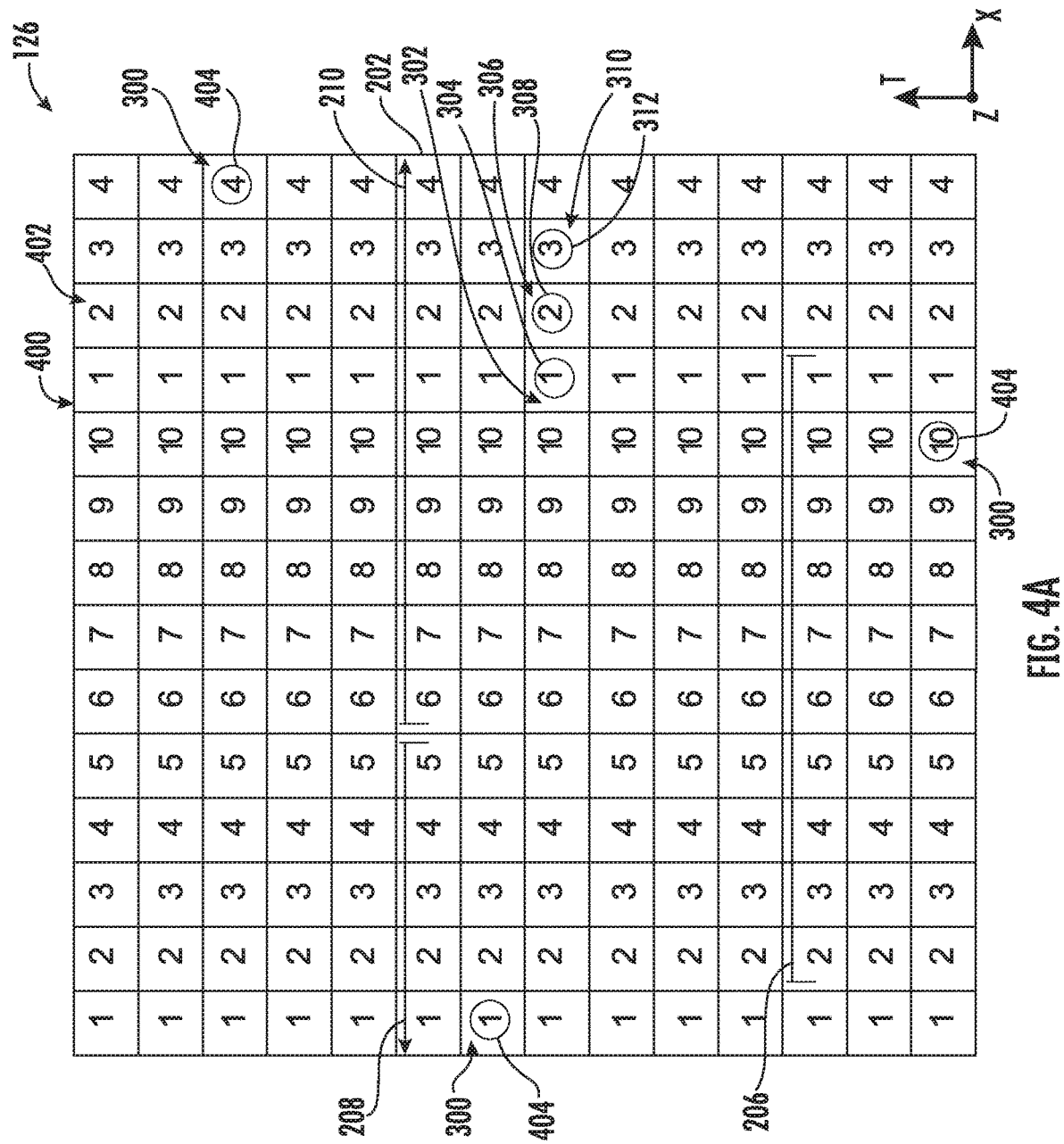
FIGS. 4A-4C show grids that represent the spatial location of the conduction gates along the vertical axis of the support members.
Figure 4B:
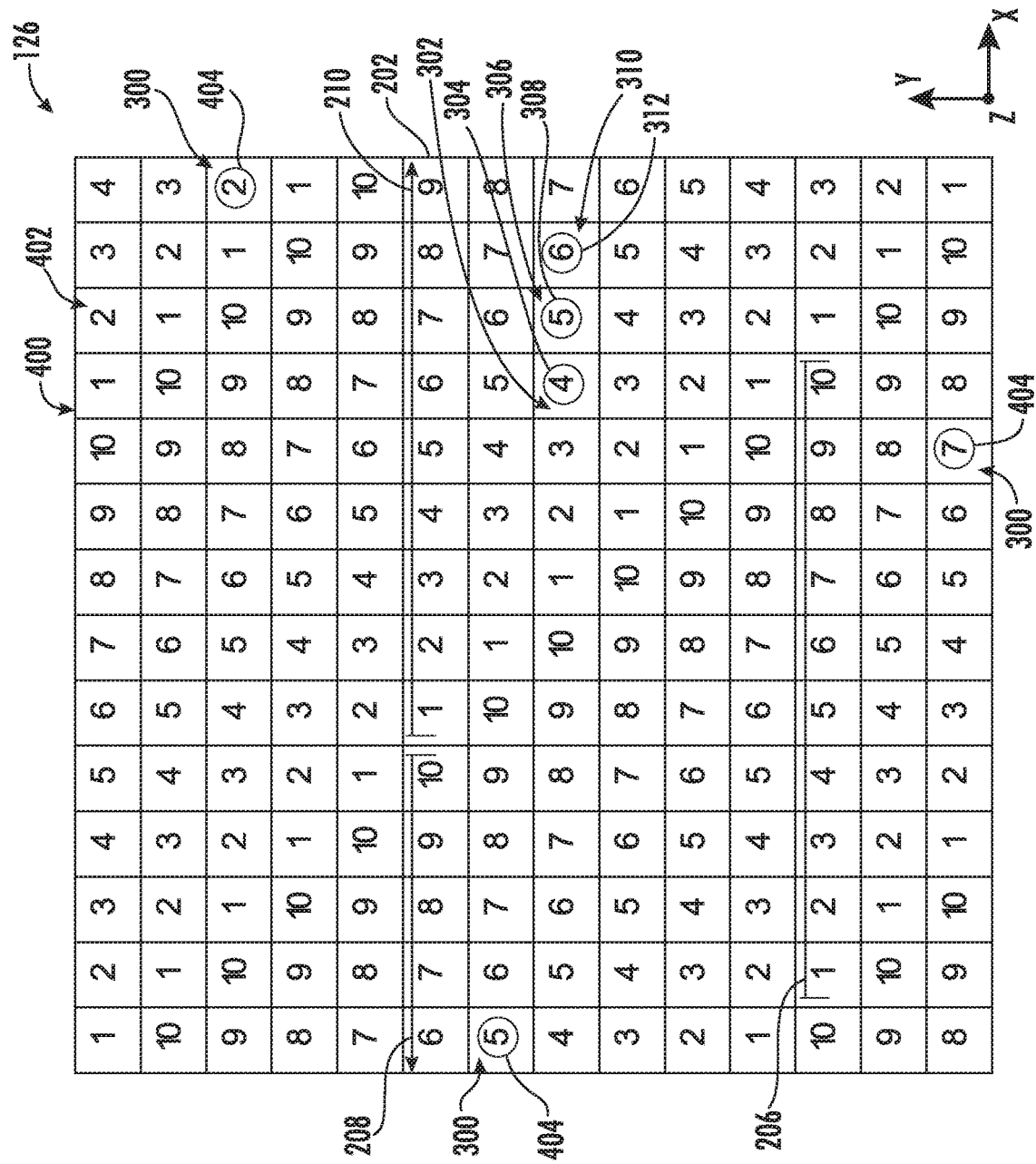
Figure 4C:
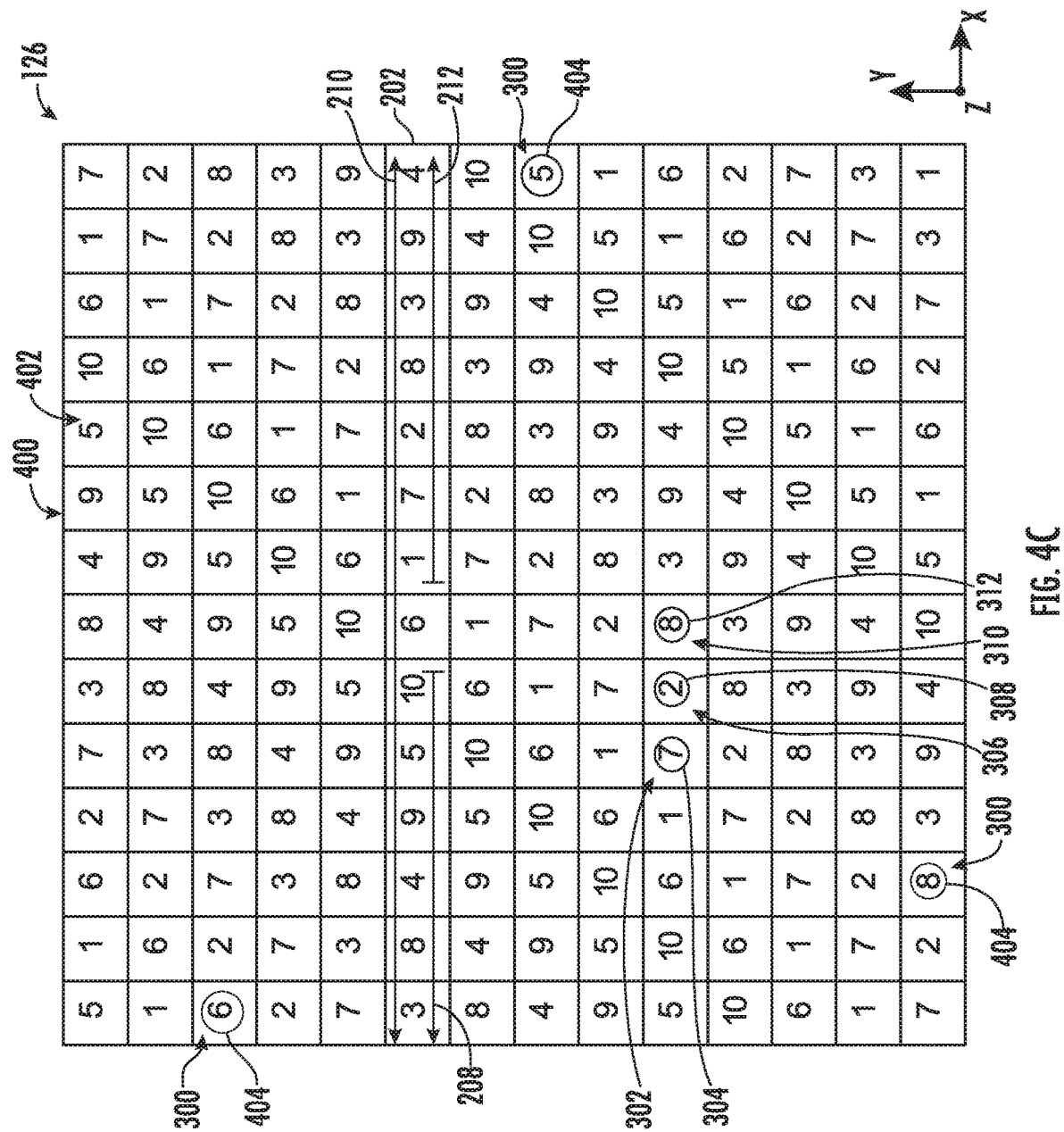

The location of the conduction gates 300 may be distributed along the vertical axis of the respective support members 202 within an array of support members 202 of a support structure 126 in both the X and Y directions. For example, FIGS. 4A-4C show a grid 400 representing exemplary spatial locations of conductions gates 300 on the support members 202 within an interval 206 of a support structure 126. The grid 400 may include at least a portion of the first interval 208, the second interval 210, and/or the third interval 212, and so on, of the support structure 126. Each box 402 in the grid 400 represents a conduction gate 300. The X and Y position of the box 402 in the grid 400 reflect the relative X and Y position of the corresponding conduction gate 300 within the interval 206 of the support structure 126. The numerical value 404 in the box 402 corresponds to the location of the corresponding conduction gate 300 along the Z-axis or vertical axis of the support member 202. As shown in FIG. 4A, the location of the conduction gates 300 along the vertical axis of the support members may vary across the X-axis while remaining constant across the Y-axis, or vice versa. As shown in FIG. 4B, the location of the conduction gates 300 along the vertical axis of the support members 202 may vary across both the X and Y axis of the support structure 126. As shown in FIG. 4B, the intervals 206 may overlap in both the X and Y direction of the support structure 126.

Any number of support members 202 may be included in an interval 206 of a support structure 126. For example, as shown in FIGS. 3A, 3B, 3G, and 3H, an interval 206 may include ten (10) support members 202. The number of support members 202 shown are provided by way of example only and not to be limiting. In some embodiments, an interval 206 may include from 1 to 50 support members 202, such as from 5 to 25 support members 202, such as from 5 to 15 support members 202, such as from 8 to 12 support members 202, such as from 25 to 50 support members 202, or such as from 35 to 40 support members 202. An interval 206 may include at least 5 support members 202, such as at least 10 support members 202, such as at least 15 support members 202, such as at least 20 support members 202, such as at least 25 support members 202, such as at least 35 support members 202, such as at least 45 support members 202. An interval 206 may include 50 support members 202 or less, such as 40 support members 202 or less, such as 30 support members 202 or less, such as 20 support members 202 or less, such as 15 support members 202 or less, or such as 10 support members 202 or less.

A support structure 126 may include support members 202 that have any desired width and length, or any desired combination of widths and lengths. In some embodiments, a support structure 126 may include support members 202 that are from 1 to 100 mm long, such as from 1 to 10 mm, such as from 1 to 5 mm, such as from 2 to 5 mm, such as from 3 to 6 mm, such as from 5 to 20 mm, such as from 10 to 20 mm, such as from 15 to 20 mm, such as from 20 to 100 mm, such as from 25 to 50 mm, such as from 50 to 75 mm, or such as from 75 to 100 mm. The support members 200 may be at least 1 mm long, such as at least 2 mm, such as at least 3 mm, such as at least 5 mm, such as at least 10 mm, such as at least 15 mm, such as at least 25 mm, such as at least 50 mm, or such as at least 75 mm. The support members 202 may be less than 100 mm long, such as less than 75 mm, such as less than 50 mm, such as less than 25 mm, such as less than 20 mm, such as less than 15 mm, such as less than 10 mm, such as less than 5 mm, such as less than 3 mm, or such as less than 2 mm.

In some embodiments, a support structure 126 may include support members 202 that are from 500 to 10,000 micrometers wide, such as from 750 to 7,500 µm, such as from 1,000 to 5,000 µm, such as from 750 to 2500 µm, such as from 1,000 to 2,500 µm, such as from 1,000 to 2,000 µm, such as from 1,250 to 1,750 µm, such as from 1,400 to 1,600 µm, such as from 1,500 to 3,000 µm, such as from 1,500 to 2,500 µm, or such as from 2,000 to 2,750 µm. A support structure may include support members 200 that are at least 500 micrometers wide, such as at least 750 µm, such as at least 1,000 µm, such as at least 1,250 µm, such as at least 1,500 µm, such as at least 1,750 µm, such as at least 2,000 µm, such as at least 2,250 µm, such as at least 2,500 µm, such as at least 2,750 µm, such as at least 5,000 µm, or such as at least 7,500 µm. A support structure may include support members 200 that are less than 10,000 micrometers wide, such as 7,500 µm or less, such as 5,000 µm or less, such as 3,000 µm or less, such as 2,750 µm or less, such as 2,500 µm or less, such as 2,250 µm or less, such as 2,000 µm or less, such as 1,750 µm or less, such as 1,500 µm or less, such as 1,250 µm or less, such as 1,000 µm or less, or such as 750 µm or less.

A support structure 126 may include support members 202 with a conduction gate 300 that has any desired width and length, or support members 202 that include a conduction gate 300 that has any desired combination of widths and lengths. In some embodiments, a support member 202 may have a conduction gate 300 ranging from 10 to 6,000 micrometers long, such as from 50 to 5,000 µm, such as from 100 to 2,500 µm, such as from 50 to 1,200 µm, such as from 100 to 1,000 µm, such as from 200 to 800 µm, such as from 400 to 600 µm, such as from 150 to 500 µm, such as from 150 to 300 µm, such as from 500 to 700 µm, such as from 700 to 1,100 µm, or such as from 800 to 1,000 µm. A conduction gate 300 may be at least 10 micrometers long, such as at least 50 µm, such as at least 100 µm, such as at least 250 µm, such as at least 500 µm, such as at least 750 µm, such as at least 1,000 µm, such as at least 2,500 µm, or such as at least 5,000 µm. A conduction gate 300 may be less than 5,000 µm long, such as less 4,000 µm or less, such as 2,500 µm or less, such as 1,200 µm or less, such as 1,000 µm or less, such as 750 µm or less, such as 500 µm or less, such as 250 µm or less, or such as 100 µm or less.

In some embodiments, a support member 202 may have a conduction gate 300 ranging from 10 to 3,000 micrometers wide, such as from 50 to 5,000 µm, such as from 100 to 2,500 µm, such as from 50 to 1,200 µm, such as from 100 to 1,000 µm, such as from 200 to 800 µm, such as from 400 to 600 µm, such as from 150 to 500 µm, such as from 150 to 300 µm, such as from 500 to 700 µm, such as from 700 to 1,100 µm, or such as from 800 to 1,000 µm. A conduction gate 300 may be at least 10 micrometers wide, such as at least 50 µm, such as at least 100 such as at least 250 µm, such as at least 500 µm, such as at least 750 µm, such as at least 1,000 µm, such as at least 2,500 µm, or such as at least 5,000 µm. A conduction gate 300 may be less than 5,000 µm long, such as less 4,000 µm or less, such as 2,500 µm or less, such as 1,200 µm or less, such as 1,000 µm or less, such as 750 µm or less, such as 500 µm or less, such as 250 µm or less, or such as 100 µm or less.

In some embodiments, the support members 202 may have a cross-sectional profile corresponding to any polyhedral shape, including circular, semi-circular, oval, rectangular, polyhedral, or combinations of these. FIGS. 5A-5C show exemplary side-profiles of support members 202 that have conduction gates 300 with various side profiles. As shown in FIG. 5A, a conduction gate 300 may have a rectangular side profile. As shown in FIG. 5B, a conduction gate 300 may have a frustoconical side profile. As shown in FIG. 5C, a conduction gate 300 may have an hourglass side profile. The side profiles shown in FIGS. 5A-5C are provided by way of example and are not to be limiting. It will be appreciated that a support structure 126 may include support members 202 that have conduction gates 300 with any desired side profile, all of which are within the sprit and scope of the present disclosure.

FIGS. 5D-5H show exemplary cross-sections of support members 202 that have conduction gates 300. As shown in FIG. 5D, a support member 202 may have an elongate cross-section, such as corresponding to a rail-like configuration. As shown in FIGS. 5E-5H, a support member 202 may have a narrow-cross-section, such as corresponding to a post-like configuration. As shown in FIG. 5E, a support member 202 may have a rectangular cross-section, and the support member 202 may have a conduction gate 300 with a rectangular cross-section. As shown in FIG. 5F, a support member 202 may have a circular cross-section, and the support member 202 may have a conduction gate 300 with a circular cross-section. As shown in FIG. 5G, a support member 202 may have a rectangular cross-section, and the support member 202 may have a conduction gate 300 with a circular cross-section. As shown in FIG. 5H, a support member 202 may have a circular cross-section, and the support member 202 may have a conduction gate 300 with a rectangular cross-section. The cross-sections shown in FIGS. 5D-5H are provided by way of example and are not to be limiting. It will be appreciated that a support structure 126 may include support members 202 with any desired cross-section as well as conduction gates 300 with any desired cross-section, all of which are within the sprit and scope of the present disclosure.

Various components 108 and their respective support structures 126 may be formed according to the present disclosure using any desired materials compatible with a PBF system. Exemplary materials include metals and metal alloys, such as metals or metal alloys that include tungsten, aluminum, chromium, copper, cobalt, molybdenum, tantalum, titanium, nickel, steel, and combinations thereof, as well as superalloys, such as austenitic nickel-chromium-based superalloys. Further exemplary materials include plastics, ceramics and composite materials.

Figure 6:
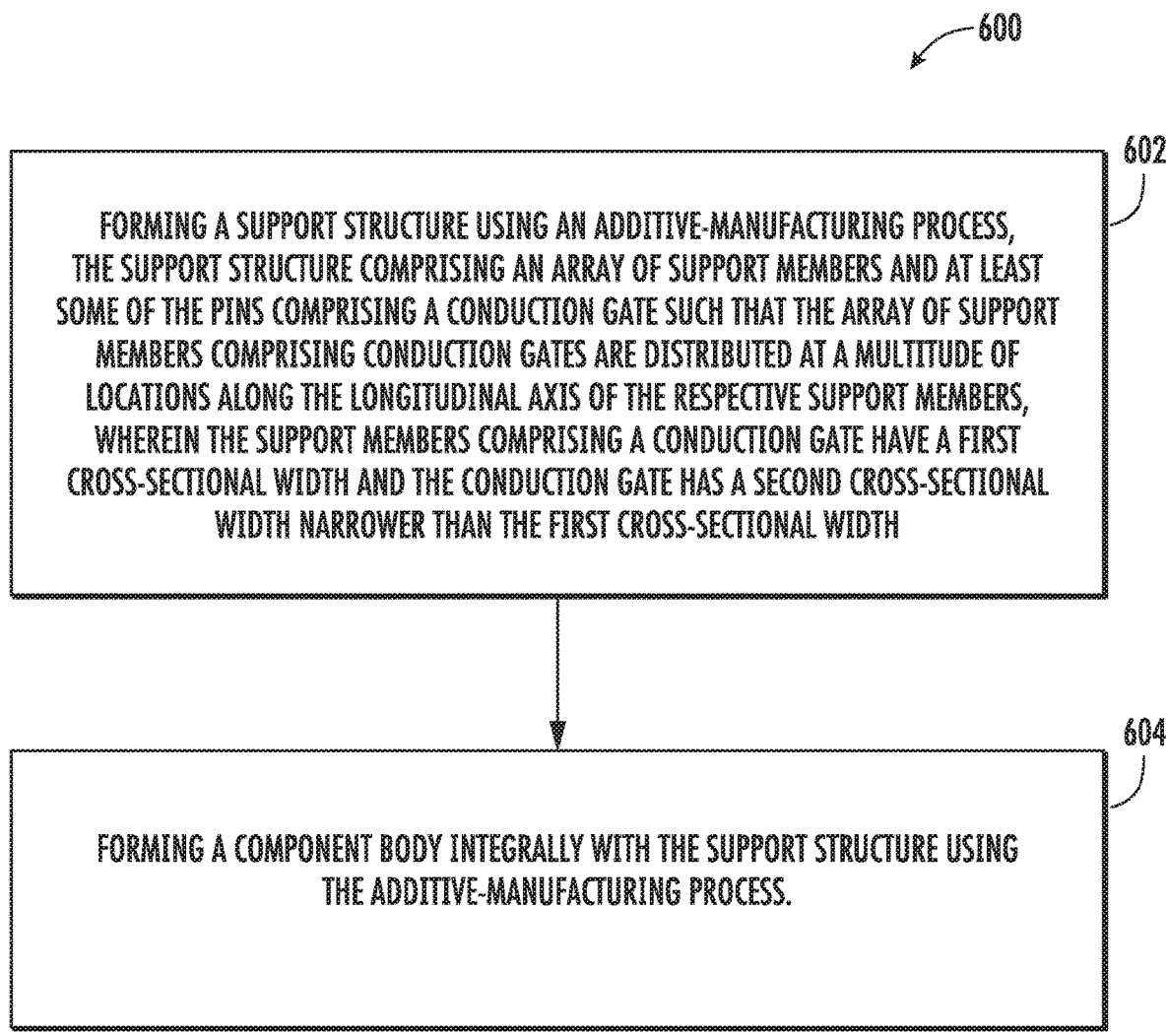
FIG. 6 shows a flow chart depicting an exemplary method of securing a component to a build platform during additive manufacturing.

Now turning to FIG. 6, exemplary methods of securing a component to a build platform during additive manufacturing will be discussed. Exemplary methods may be performed using an additive-manufacturing system 100 including those described herein. An exemplary method 600 includes forming a support structure using an additive-manufacturing process 602 and forming a component body integrally with the support structure using the additive-manufacturing process 604. The support structure 126 may include an array of support members 202 and at least some of the support members 202 may include a conduction gate 300 such that the conduction gates 300 are distributed at a multitude of locations along the vertical axis of the respective support members 202. The support members 202 that include a conduction gate 300 may have a first cross-sectional width and the conduction gate 300 may have a second cross-sectional width narrower than the first cross-sectional width. In some embodiments, the additive-manufacturing process may include powder bed fusion (PBF).

As examples, the additive-manufacturing process may include direct metal laser melting (DMLM), electron beam melting (EBM), selective laser melting (SLM), directed metal laser sintering (DMLS), and/or selective laser sintering (SLS). The support structure and/or the component body may be formed using a powder 104, such as a powder 104 that includes a metal or metal alloy, a plastic, a ceramic, and/or a composite. As examples, a metal or metal alloy powder may include tungsten, aluminum, chromium, copper, cobalt, molybdenum, tantalum, titanium, nickel, and steel, and combinations thereof, as well as superalloys, such as austenitic nickel-chromium-based superalloys.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively-manufactured component, comprising:
   a support structure comprising an array of support members and a component body integrally formed with the support structure using an additive-manufacturing process, at least some of the support members comprising a conduction gate integrally formed as part of the respective support member such that the array of support members comprises conduction gates distributed at a multitude of locations along the vertical axis of the respective support members, wherein the support members comprising a conduction gate have a first cross-sectional width and the conduction gate has a second cross-sectional width narrower than the first cross-sectional width.

2. The additively-manufactured component of claim 1, comprising:
   the support structure melted or fused to a build platform.

3. The additively-manufactured component of claim 1, comprising:
   the array of support members segmented according to a plurality of intervals distributed across the support structure along an X-axis and/or a Y-axis.

4. The additively-manufactured component of claim 1, wherein the conduction gates have a rectangular, frustoconical, or hourglass side profile.

5. The additively-manufactured component of claim 1, comprising:
   at least some of the conduction gates distributed along the vertical axis of the respective support members in a step-wise manner.

6. The additively-manufactured component of claim 5, comprising:
   a first support member comprising a first conduction gate located at a first vertical position along the vertical axis of the first support member, and a second support member comprising a second conduction gate located at a second vertical position along the vertical axis of the second support member, wherein the first vertical position of the first conduction gate is below the second vertical position of the second conduction.

7. The additively-manufactured component of claim 5, wherein at least some of the conduction gates are distributed across an interval of the support structure at a vertical position according to the following equation: $z(n)=(s\times n)-s/2$, where z is the vertical position of the conduction gate between 0 and L, n is the sequential support member number in the interval, and s is the length of the conduction gate, and where the equation continues up to L and then repeats, where L is the length of the support member.

8. The additively-manufactured component of claim 1, comprising:
   the array of support members segmented according to a plurality of overlapping intervals distributed across the support structure along an X-axis and/or a Y-axis.

9. The additively-manufactured component of claim 8, comprising:
   at least some of the conduction gates distributed at a multitude of locations along the vertical axis of the respective support members.

10. The additively-manufactured component of claim 9, comprising:
    at least some of the conduction gates distributed along the vertical axis of the respective support members in a step-wise manner.

11. The additively-manufactured component of claim 10, wherein the overlapping intervals together with the distribution of the conduction gates across the vertical axis of the respective support members combine to provide a sequence of conduction gates at overlapping alternating locations along the vertical axis of the respective support members.

12. The additively-manufactured component of claim 11, comprising:
    a first support member associated with a first interval, a second support member associated with a second interval, and a third support member associated with the first interval, the first support member comprising a first conduction gate located at a first position along the vertical axis of the first support member, the second support member comprising a second conduction gate located at a second vertical position along the vertical axis of the second support member, and the third support member comprising a third conduction gate located at a third vertical position along the vertical axis of the third support member;
    wherein the first vertical position of the first conduction gate is above the second vertical position of the second conduction gate, and the third vertical position of the third conduction gate is above the second vertical position of the second conduction gate.

13. The additively-manufactured component of claim 12, wherein the third vertical position of the third conduction gate is below the first vertical position of the first conduction gate.

14. The additively-manufactured component of claim 8, comprising:
    a plurality of conduction gates associated with a first interval distributed along the vertical axis of the respective support members in a first step-wise manner, and a plurality of conduction gates associated with a second interval distributed along the vertical axis of the respective support members in a second step-wise manner.

15. The additively-manufactured component of claim 8, comprising:

a plurality of conduction gates distributed across a first interval and a second interval of the support structure at a vertical position according to the following respective equations: $z(n_1)=(s \times n_1)-s/2+0.5\ L$; and $z(n_2)=(s \times n_2)-s/2$; where z is the vertical position of the conduction gate between 0 and L, $n_1$ is the sequential support member number in the first interval, $n_2$ is the sequential support member number in the second interval, and s is the length of the conduction gate, and where the equations continue up to L and then repeat, where L is the length of the support member.

16. A method of securing a body of a component to a build platform during additive manufacturing, the method comprising:

forming a support structure using an additive-manufacturing process, the support structure comprising an array of support members and at least some of the support members comprising a conduction gate integrally formed as part of the respective support member such that the array of support members comprises conduction gates distributed at a multitude of locations along the vertical axis of the respective support members, wherein the support members comprising a conduction gate have a first cross-sectional width and the conduction gate has a second cross-sectional width narrower than the first cross-sectional width; and forming a component body integrally with the support structure using the additive-manufacturing process.

17. The method of claim 16, wherein the additive-manufacturing process comprises powder bed fusion (PBF).

18. The method of claim 17, wherein the additive-manufacturing process comprises direct metal laser melting (DMLM), electron beam melting (EBM), selective laser melting (SLM), directed metal laser sintering (DMLS), and/or selective laser sintering (SLS).

19. The method of claim 16, comprising forming the support structure and/or the component body using a powder, the powder comprising a metal or metal alloy, a plastic, a ceramic, and/or a composite.

20. The method of claim 16, comprising forming the support structure and/or the component body using a metal or metal alloy powder, the metal or metal alloy comprising tungsten, aluminum, chromium, copper, cobalt, molybdenum, tantalum, titanium, nickel, and/or steel.

* * * * *